United States Patent
Kimura et al.

(10) Patent No.: US 7,625,831 B2
(45) Date of Patent: Dec. 1, 2009

(54) ANISOTROPICALLY SHAPED CERAMIC PARTICLES AND METHOD FOR PRODUCING THE SAME

(75) Inventors: Masahiko Kimura, Kusatsu (JP); Kosuke Shiratsuyu, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 12 days.

(21) Appl. No.: 12/170,488

(22) Filed: Jul. 10, 2008

(65) Prior Publication Data
US 2008/0305332 A1  Dec. 11, 2008

Related U.S. Application Data

(63) Continuation of application No. PCT/JP2006/320638, filed on Oct. 17, 2006.

(30) Foreign Application Priority Data

Jan. 12, 2006  (JP) .............................. 2006-005129

(51) Int. Cl.
   *C04B 35/01* (2006.01)
   *C04B 35/495* (2006.01)
   *C04B 35/64* (2006.01)

(52) U.S. Cl. ...................... 501/134; 423/62; 423/69; 423/87; 423/179; 423/179.5; 423/594.17; 423/641

(58) Field of Classification Search ................ 501/134; 423/62, 69, 87, 179, 179.5, 641, 594.17
See application file for complete search history.

(56) References Cited

U.S. PATENT DOCUMENTS

| | | | |
|---|---|---|---|
| 6,093,338 A * | 7/2000 | Tani et al. ............... | 252/62.9 R |
| 6,299,815 B1 * | 10/2001 | Kimura et al. .............. | 264/235 |
| 6,387,295 B1 * | 5/2002 | Saito ...................... | 252/62.9 R |
| 6,692,652 B2 * | 2/2004 | Takao et al. ............. | 252/62.9 R |
| 6,864,621 B2 * | 3/2005 | Ogawa et al. ............... | 310/358 |
| 7,267,783 B2 * | 9/2007 | Nonoyama et al. ...... | 252/62.9 R |
| 7,310,874 B2 * | 12/2007 | Higuchi et al. ................ | 29/842 |
| 7,560,089 B2 * | 7/2009 | Takao et al. ............. | 423/594.7 |
| 2003/0008762 A1 | 1/2003 | Takao et al. | |
| 2004/0214723 A1 | 10/2004 | Nonoyama et al. | |

FOREIGN PATENT DOCUMENTS

| | | |
|---|---|---|
| JP | 10053465 | 2/1998 |
| JP | 2000203935 | 7/2000 |
| JP | 2003012373 | 1/2003 |
| JP | 2004107527 | 4/2004 |
| JP | 2005272266 | 10/2005 |

* cited by examiner

*Primary Examiner*—H. (Holly) T Le
(74) *Attorney, Agent, or Firm*—Dickstein, Shapiro, LLP.

(57) ABSTRACT

Anisotropically shaped ceramic particles are represented by the general formula $\{(K_{1-x-y}Na_xLi_y)_4(Nb_{1-z}Ta_z)_6O_{17}+ aMeO_b\}$ (where Me is at least one element selected from the group consisting of antimony, copper, manganese, vanadium, silicon, titanium, and tungsten; and b is a positive number determined by the valence of Me), where x, y, z, and a satisfy $0 \leq x \leq 0.5$, $0 \leq y \leq 0.3$, $0 \leq z \leq 0.3$, and $0.001 \leq a \leq 0.1$, respectively. The anisotropically shaped ceramic particles have a plate-like shape. The average particle size is 1 to 100 μm, and the ratio D/t of the maximum diameter D of a main surface to the thickness t in a direction perpendicular to the main surface is 2 or more, preferably 5 or more. Thus, anisotropically shaped ceramic particles suitable as a reactive template for preparing a crystal-oriented alkali metal niobate-based ceramic can be produced at relatively low production costs without the need for a complicated production process.

20 Claims, 2 Drawing Sheets

[Fig.1]
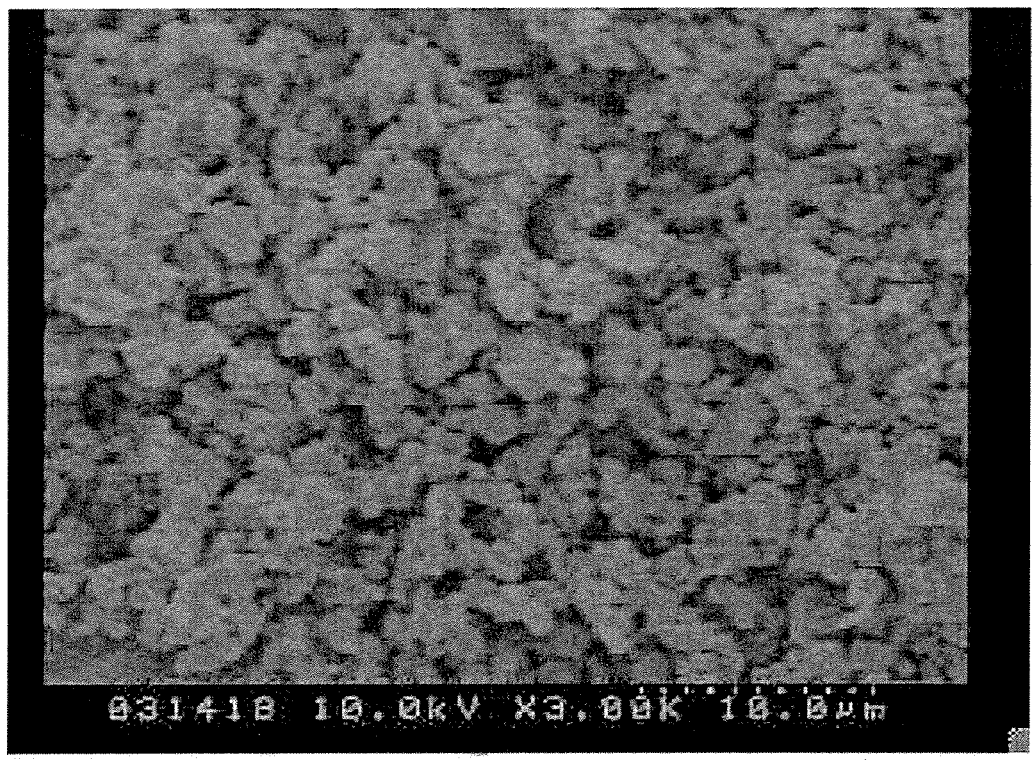
[Fig.2]
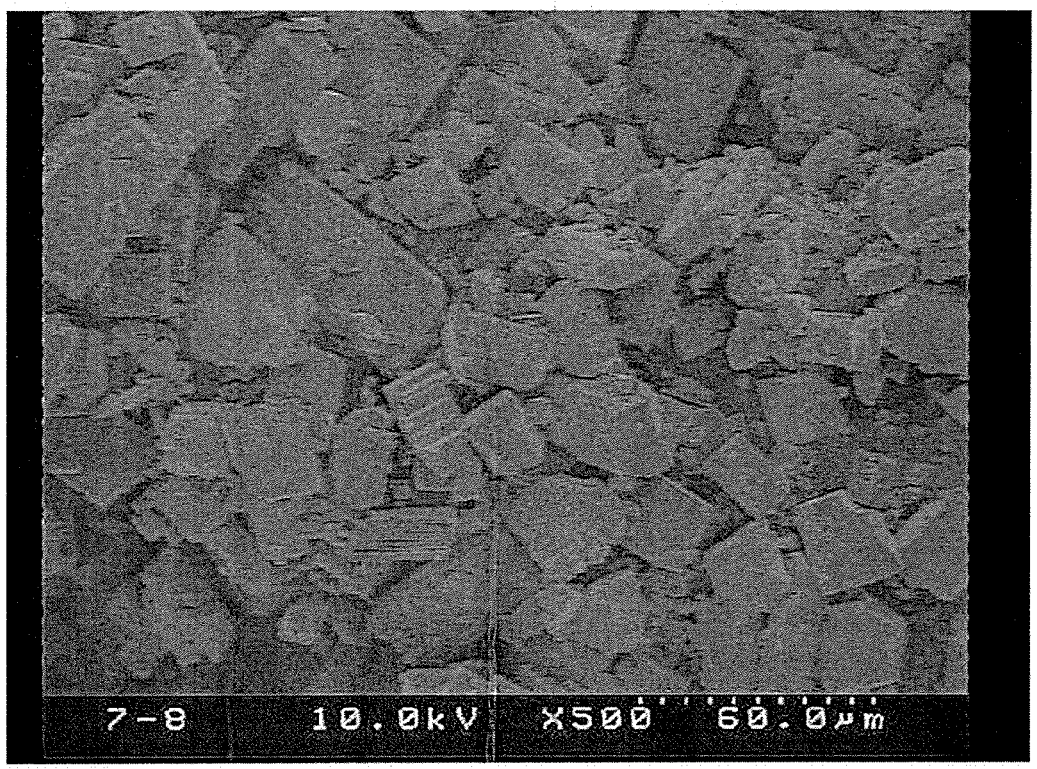

[Fig.3]
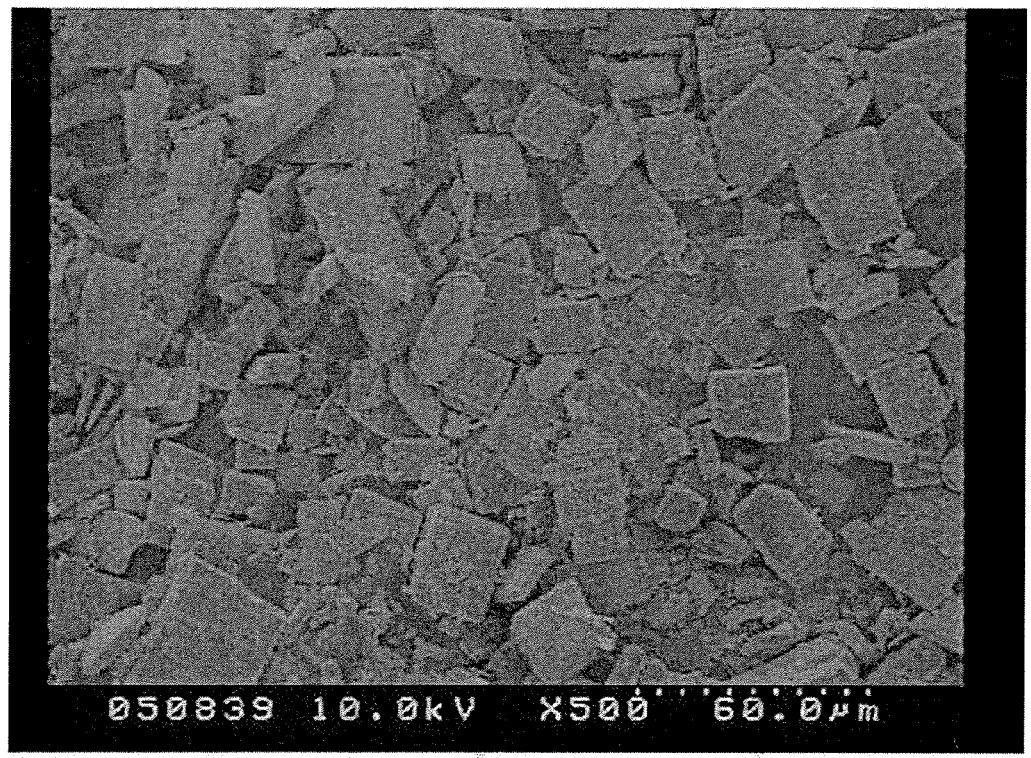

ANISOTROPICALLY SHAPED CERAMIC PARTICLES AND METHOD FOR PRODUCING THE SAME

This is a continuation of application Serial No. PCT/JP2006/320638, filed Oct. 17, 2006.

TECHNICAL FIELD

The present invention relates to anisotropically shaped ceramic particles and methods for producing the particles, and specifically, to anisotropically shaped ceramic particles for preparing crystal-oriented ceramics and a method for producing the particles.

BACKGROUND ART

Lead-based perovskite compounds, such as lead zirconate titanate, have been widely used as piezoelectric ceramic materials because they have high piezoelectricity. Recently, however, piezoelectric ceramic materials which contain no lead have increasingly been preferred from the viewpoint of environmental friendliness. For example, there has been extensive research and development of lead-free perovskite alkali metallate(V) compounds, as typified by alkali metal niobates.

Anisotropic perovskite compounds, which are known to show different piezoelectric characteristics in different crystal-axis directions, can provide superior piezoelectric characteristics if their crystal axes are oriented. Accordingly, alkali metal niobate-based piezoelectric materials are expected to provide superior piezoelectric characteristics if their crystal axes are oriented.

One known method for orienting the crystal axes of an anisotropic perovskite compound with a high degree of orientation is discussed in Patent Document 1.

Patent Document 1 proposes a method for producing a crystal-oriented ceramic which includes a step of mixing a first anisotropically shaped powder whose growth plane (plane of the largest area) has lattice matching with a particular crystal plane of a predetermined first perovskite alkali metallate(V) compound and a first reaction material that reacts with the first anisotropically shaped powder to produce at least the first perovskite alkali metallate(V) compound; a step of molding the mixture prepared in the mixing step so that the first anisotropically shaped powder is oriented; and a heat-treatment step of heating the compact prepared in the molding step so that the first reaction material reacts with the first anisotropically shaped powder.

According to Patent Document 1, the first anisotropically shaped powder is produced by the following method.

The first anisotropically shaped powder is produced by heating, in a flux, a second anisotropically shaped powder whose growth plane is a {001} plane and which is formed of a bismuth-based layered perovskite compound represented by the general formula $(Bi_2O_2)^{2+}(Bi_{0.5}AM_{m-1.5}Nb_mO_{3m+1})^{2-}$ (where m is an integer of 2 or more and AM is at least one alkali metal element selected from the group consisting of sodium, potassium, and lithium) and a second reaction material that reacts with the second anisotropically shaped powder to produce at least a second perovskite alkali metallate(V) compound.

That is, the plate-like powder of a layered perovskite compound functions as a reactive template for producing an anisotropic perovskite compound. If a perovskite alkali metallate(V) compound, such as potassium niobate, is prepared using a bismuth-based layered perovskite compound as a reactive template, A-site components, such as bismuth, contained in the reactive template inevitably remains as impurities in the resultant perovskite alkali metallate(V) compound. This makes it difficult to achieve desired superior piezoelectric characteristics.

However, the redundant A-site components contained in the bismuth-based layered perovskite compound (second anisotropically shaped powder) can be removed as redundant components by optimizing the compositions of the bismuth-based layered perovskite compound and the second reaction material and heating them to their eutectic point, or melting point, in a flux.

According to Patent Document 1, the bismuth-based layered perovskite compound is first used as a reactive template to prepare the first anisotropically shaped powder with the A-site components removed therefrom. The first anisotropically shaped powder is then used as a reactive template to prepare an oriented perovskite alkali metallate(V) compound. The bismuth-based layered perovskite compound with the optimum composition is produced by a method involving heat treatment, such as the flux method or hydrothermal synthesis.

Patent Document 1: Japanese Unexamined Patent Application Publication No. 2003-12373 (as in Claims 2 and 3 and Paragraphs [0064] and [0070]-[0075]).

DISCLOSURE OF INVENTION

Problems to be Solved by the Invention

According to Patent Document 1, described above, the compositions of the bismuth-based layered perovskite compound and the second reaction material are optimized to remove the redundant A-site components, although such optimum compositions are not easy to determine. That is, the optimum composition of the final product, namely, a crystal-oriented ceramic, varies with the piezoelectric performance required, which depends on the application etc., and it is therefore not easy to determine the optimum compositions of the bismuth-based layered perovskite compound and the second reaction material for such various types of crystal-oriented ceramic.

According to Patent Document 1, additionally, heat treatment is performed in the flux method or hydrothermal synthesis, for example, to produce the bismuth-based layered perovskite compound and is also performed to produce the first anisotropically shaped powder using the bismuth-based layered perovskite compound as a reactive template. Hence, the production of the first anisotropically shaped powder, functioning as the reactive template for the crystal-oriented ceramic, involves at least two heat-treatment steps which increases production costs.

An object of the present invention, which has been made in light of the above circumstances, is to provide anisotropically shaped ceramic particles that are used to prepare a lead-free crystal-oriented ceramic and that can be produced at relatively low production costs without the need for a complicated production process and also provide a method for producing such particles.

Means for Solving the Problems

If the anisotropically shaped ceramic particles functioning as a reactive template contain only the constituent elements required for the final product, namely, a perovskite alkali metallate(V) compound, undesired components such as bismuth are not contained in the perovskite alkali metallate(V)

compound. This eliminates the need to perform a complicated task such as the optimization of composition as discussed in Patent Document 1.

From this viewpoint, the inventors have intensively studied alkali metal niobate-based ceramics. As a result, the inventors have found that anisotropically shaped ceramic particles suitable as a reactive template for preparing a crystal-oriented alkali metal niobate-based ceramic can be produced by controlling the molar contents of the constituent elements of its major component, including potassium, sodium, lithium, niobium, and tantalum, within predetermined ranges and adding a particular oxide as a minor component within a predetermined range per mole of the major component.

The present invention is based on the above findings. Anisotropically shaped ceramic particles according to the present invention are anisotropically shaped ceramic particles of plate-like shape that are represented by the general formula $\{(K_{1-x-y}Na_xLi_y)_4(Nb_{1-z}Ta_z)_6O_{17}+aMeO_b\}$ (where Me is at least one element selected from the group consisting of antimony, copper, manganese, vanadium, silicon, titanium, and tungsten; and b is a positive number determined by the valence of Me), where x, y, z, and a are $0 \leq x \leq 0.5$, $0 \leq y \leq 0.3$, $0 \leq z \leq 0.3$, and $0.001 \leq a \leq 0.1$, respectively.

The average particle size of the above anisotropically shaped ceramic particles was measured to be 1 to 100 µm, and the ratio D/t of the maximum diameter D of a main surface to the thickness t in a direction perpendicular to the main surface, that is, the aspect ratio, was determined to be 2 or more. This shows that the anisotropically shaped ceramic particles can be used as a reactive template suitable for preparing a crystal-oriented alkali metal niobate-based ceramic.

That is, the average particle size of the anisotropically shaped ceramic particles of the present invention is 1 to 100 µm, and the ratio D/t of the maximum diameter D of a main surface to the thickness t in a direction perpendicular to the main surface is 2 or more.

In addition, a method according to the present invention for producing anisotropically shaped ceramic particles is a method for producing anisotropically shaped ceramic particles of plate-like shape for preparing a crystal-oriented ceramic. This method includes a step of weighing out and mixing major-component materials so that the major component is represented by the general formula $(K_{1-x-y}Na_xLi_y)_4(Nb_{1-z}Ta_z)_6O_{17}$ (where $0 \leq x \leq 0.5$, $0 \leq y \leq 0.3$, and $0 \leq z \leq 0.3$) and calcining the mixture to prepare a calcined powder; a step of weighing out a minor-component material so that a minor component comprising an oxide containing at least one element selected from the group consisting of antimony, copper, manganese, vanadium, silicon, titanium, and tungsten is contained in an amount of 0.001 to 0.1 moles (on the basis of the Me element) per mole of the major component and mixing the minor-component material with the calcined powder to prepare a mixed powder; a step of adding a flux component to the mixed powder and heating the powder; and a step of removing the flux component after the heat treatment.

In the method of the present invention for producing anisotropically shaped ceramic particles, the flux component is one of KCl, NaCl, and a mixture thereof.

Advantages

The above anisotropically shaped ceramic particles, containing no undesired components such as bismuth, can be used to prepare anisotropically shaped ceramic particles whose major component contains only the constituent elements required for the final product, namely, an alkali metal niobate-based ceramic. In addition, the molar content a of the minor component, namely, $MeO_b$, is 0.001 to 0.1 moles per mole of the major component, which is such a low content that the minor component has little effect on the piezoelectricity of the final product, namely, an alkali metal niobate-based ceramic, for practical use.

In addition, an alkali metal niobate-based ceramic can be prepared with excellent dispersibility because the average particle size is 1 to 100 µm and the ratio D/t of the maximum diameter D of a main surface to the thickness t in the direction perpendicular to the main surface, that is, the aspect ratio, is 2 or more. Thus, an alkali metal niobate-based ceramic with a desired orientation can be prepared.

That is, an alkali metal niobate-based ceramic, such as $KNbO_3$, with superior piezoelectric characteristics can readily be prepared using the anisotropically shaped ceramic particles of the present invention as a reactive template.

According to the method of the present invention for producing anisotropically shaped ceramic particles, the heat treatment involved in the process of producing the anisotropically shaped ceramic particles is only that performed after the flux component is added to the mixed powder. This process therefore requires only one heat treatment, so that the cost of heat treatment, and therefore production costs, can be reduced. In addition, there is no fear of contamination with undesired A-site components such as bismuth because a bismuth-based layered perovskite compound, as used in Patent Document 1, is not used. Thus, anisotropically shaped ceramic particles of desired plate-like shape can readily be produced without considering the optimization of composition.

In addition, the flux component, which is one of KCl, NaCl, and a mixture of KCl and NaCl, can readily be removed by rinsing with, for example, ion exchange water.

BRIEF DESCRIPTION OF DRAWINGS

FIG. 1 is a scanning electron micrograph of some of a sample of Sample No. 6.

FIG. 2 is a scanning electron micrograph of some of a sample of Sample No. 4.

FIG. 3 is an electron micrograph of some of a ceramic powder prepared using the sample of Sample No. 6.

BEST MODES FOR CARRYING OUT THE INVENTION

Next, a preferred embodiment of the present invention will be described.

The composition of anisotropically shaped ceramic particles according to the present invention is represented by general formula (1), and the particles have a plate-like shape.

In the present invention, the term "plate-like" means that the ratio of the maximum diameter of a main surface to its minimum diameter is 2 or less and that the aspect ratio (the ratio of the maximum diameter D of the main surface to the thickness t in a direction perpendicular to the main surface, namely, D/t) is 2 or more.

$$(K_{1-x-y}Na_xLi_y)_4(Nb_{1-z}Ta_z)_6O_{17}+aMeO_b \tag{1}$$

where x, y, z, and a satisfy the following formulae (2) to (5), respectively:

$$0 \leq x \leq 0.5 \tag{2}$$

$$0 \leq y \leq 0.3 \tag{3}$$

$$0 \leq z \leq 0.3 \tag{4}$$

$$0.001 \leq a \leq 0.1 \tag{5}$$

That is, the major component of the anisotropically shaped ceramic particles of the present invention is represented by the general formula $(K_{1-x-y}Na_xLi_y)_4(Nb_{1-z}Ta_z)_6O_{17}$, and the particles also contain the particular oxide, $MeO_b$, in an amount of a moles, namely, 0.001 to 0.1 moles, per mole of the major component.

The element Me is selected from elements capable of ensuring an average particle size of 1 μm or more and an aspect ratio of 2 or more, preferably 5 or more, when the elements are mixed with the major component and are subjected to heat treatment, even if they are contained in a small amount, namely, 0.001 to 0.1 moles per mole of the major component. Specifically, at least one particular element is selected from the group consisting of antimony, copper, manganese, vanadium, silicon, titanium, and tungsten.

The value b in $MeO_b$ is a positive number determined by the valence of the element Me used. For example, b is 3/2 if the element Me used is antimony, which has a valence of 3; b is 1 if the element Me used is copper, which has a valence of 2; and b is 5/2 if the element Me used is vanadium, which has a valence of 5.

In addition, the above anisotropically shaped ceramic particles are formed so that they have an average particle size of 1 to 100 μm.

That is, anisotropically shaped ceramic particles having an average particle size of less than 1 μm are undesirable because such particles aggregate significantly and may therefore cause a problem in handling. Anisotropically shaped ceramic particles having an average particle size of more than 100 μm, on the other hand, are undesirable because such coarse particles tend to sediment during mixing and are therefore difficult to disperse uniformly.

The anisotropically shaped ceramic particles of the present invention, having an average particle size of 1 to 100 μm, as described above, can be provided as anisotropically shaped ceramic particles of desired plate-like shape that are suitable as a reactive template for preparing a crystal-oriented ceramic.

Thus, the anisotropically shaped ceramic particles of the present invention can be provided as anisotropically shaped ceramic particles of plate-like shape that are suitable for preparing a crystal-oriented ceramic with an average particle size of 1 to 100 μm and an aspect ratio of 2 or more, preferably 5 or more, because the general formula (1) satisfies the formulae (2) to (5).

Next, the reasons why x, y, z, and a are controlled within the above ranges will be described.

(i) [x]

Replacing some of the potassium with sodium increases the average particle size and the aspect ratio of the ceramic particles. It is therefore preferable to replace some of the potassium with sodium as needed. If the replacement molar ratio x of sodium exceeds 0.5, however, the average particle size and the aspect ratio become saturated, and no further increase will be expected.

Therefore, if some of the potassium is replaced with sodium, the replacement molar ratio x of sodium is 0.5 or less, preferably 0.1 or less.

(ii) [y]

Replacing some of the potassium with lithium increases the average particle size and the aspect ratio of the ceramic particles. It is therefore preferable to replace some of the potassium with lithium as needed. If the replacement molar ratio y of lithium reaches 0.3, however, the average particle size and the aspect ratio tend to decline, and it is difficult to increase the average particle size and the aspect ratio by further increasing the molar content of lithium.

Therefore, the replacement molar ratio y of lithium is 0.3 or less, preferably 0.1 or less.

(iii) [z]

Replacing some of the niobium with tantalum increases the average particle size and the aspect ratio of the ceramic particles. It is therefore preferable to replace some of the niobium with tantalum as needed. If the replacement molar ratio z of tantalum exceeds 0.3, however, the average particle size and the aspect ratio become saturated, and no further increase will be expected.

Therefore, the replacement molar ratio z of tantalum is 0.3 or less.

(iv) [a]

Adding the particular oxide $MeO_b$ to the ceramic particles as a minor component increases the average particle size and the aspect ratio of the ceramic particles. If the content of the particular oxide $MeO_b$ falls below 0.001 moles per mole of the major component, the particular oxide $MeO_b$ cannot provide the effect of increasing the average particle size and the aspect ratio because the content is insufficient. If the content of the particular oxide $MeO_b$ exceeds 0.1 moles per mole of the major component, on the other hand, the average particle size and the aspect ratio tend to decline. In addition, it is preferable to minimize the content of the minor component because the anisotropically shaped ceramic particles are used as a reactive template to prepare a crystal-oriented ceramic.

In this embodiment, therefore, the molar content a of the particular oxide $MeO_b$, contained as a minor component, is 0.001 to 0.1 moles, preferably 0.01 to 0.1 moles, per mole of the major component.

The particular oxide $MeO_b$ may be present as a minor component such that all of it is dissolved in the major component or such that some of it is dissolved in the major component while the rest is present at crystal boundaries or crystal triple points.

Next, a method for producing the above anisotropically shaped ceramic particles will be described.

First, $K_2CO_3$ and $Nb_2O_5$ and, optionally, $Na_2CO_3$, $Li_2CO_3$, and $Ta_2O_5$ are prepared as major-component materials, and predetermined amounts thereof are weighed out, mixed, and calcined at 700° C. to 800° C. for two to three hours to prepare a calcined powder to be used as the major component.

Next, at least one minor-component material, containing the element Me, of $Sb_2O_3$, CuO, $MnCO_3$, $V_2O_5$, $SiO_2$, $TiO_2$, and $WO_3$, is prepared.

The minor-component material is then weighed out so that the final content of the particular oxide $MeO_b$ is 0.001 to 0.1 moles per mole of the major component, namely, the calcined powder. The minor-component material is mixed with the calcined powder to prepare a mixture.

Next, KCl, NaCl, or a mixture of KCl and NaCl is prepared as a flux.

The mixture and the flux are mixed in a weight ratio of 1:1, are subjected to heat treatment in an alumina crucible, and are cooled to precipitate crystals. The heat treatment temperature is preferably 900° C. to 1,100° C. If the heat treatment temperature is less than 900° C., the crystal growth does not proceed sufficiently because of the low temperature, and this may result in failure to form plate-like ceramic particles. A high temperature of more than 1,100° C., on the other hand, results in unnecessary energy consumption.

Afterwards, the flux component is removed by rinsing with ion exchange water, thus obtaining anisotropically shaped ceramic particles of desired plate-like shape.

In this embodiment, the heat treatment involved in the process of producing the anisotropically shaped ceramic particles is only that performed after the flux component is added to the mixed powder. This process therefore requires only one heat treatment, so that the cost of heat treatment, and therefore production costs, can be reduced. In addition, there is no fear of contamination with undesired A-site components such as bismuth because the starting material used for the anisotropically shaped ceramic particles is not a bismuth-based layered perovskite compound. Thus, anisotropically shaped ceramic particles of desired plate-like shape can readily be produced without the need to consider the optimization of composition as discussed in the known art of Patent Document 1.

These anisotropically shaped ceramic particles can be used as a reactive template to prepare a crystal-oriented perovskite alkali metal niobate-based ceramic, as described below.

Specifically, the anisotropically shaped ceramic particles are mixed with an alkali metal compound, such as $K_2CO_3$, so that the content of the alkali metal compound is 1 mole per mole of the major component, represented by the general formula $(K_{1-x-y}Na_xLi_y)_4(Nb_{1-z}Ta_z)_6O_{17}$ (where $0 \leq x \leq 0.5$, $0 \leq y \leq 0.3$, and $0 \leq z \leq 0.3$), of the anisotropically shaped ceramic particles. This mixture is fed into a ball mill with ethanol and is sufficiently stirred in the ball mill by a wet process for a predetermined period of time to obtain a mixed powder.

Subsequently, an alkali metal niobate-based ceramic is prepared by, for example, the flux method. Specifically, the mixed powder and a flux (such as KCl, NaCl, or a mixture of KCl and NaCl) are mixed in a weight ratio of, for example, 1:1. The mixture is subjected to heat treatment in an alumina crucible at about 1,000° C. for about ten hours and is then cooled to precipitate crystals. Afterwards, the flux is removed by rinsing with ion exchange water heated to about 80° C., thus obtaining an alkali metal niobate-based ceramic.

The present invention is not limited to the above embodiment. For example, the minor component may be one that turns into the oxide $MeO_b$ after the heat treatment; it does not have to be an oxide when mixed with the major component, but may be a carbonate, such as $MnCO_3$, or a hydroxide, as shown in the above embodiment.

Because some of the potassium or the niobium can optionally be replaced with sodium, lithium, or tantalum in a predetermined replacement molar ratio, as described above, the anisotropically shaped ceramic particles of the present invention provides the advantage of ensuring a relatively high flexibility in designing the composition of the final product, namely, an alkali metal niobate-based ceramic.

Next, examples of the present invention will be specifically described.

EXAMPLE 1

First, $K_2CO_3$, $Nb_2O_5$, $Na_2CO_3$, $Li_2CO_3$, and $Ta_2O_5$ were prepared as major-component materials. These major-component materials were weighed out so that the x, y, and z of the major component $(K_{1-x-y}Na_xLi_y)_4(Nb_{1-z}Ta_z)_6O_{17}$ equaled the compositions of Table 1. The materials thus weighed out were fed into a ball mill with ethanol and were stirred by a wet process for about eight hours to prepare mixtures.

The mixtures thus prepared were dried and were then calcined at 750° C. for two hours to prepare calcined powders.

Next, $Sb_2O_3$, CuO, $MnCO_3$, $V_2O_5$, $SiO_2$, $TiO_2$, and $WO_3$ were prepared as minor-component materials. These minor-component materials were weighed out so that the final content of the particular oxide $MeO_b$, serving as the minor component, equaled the compositions of Table 1.

The calcined powders and the minor-component materials were mixed and stirred in a ball mill with ethanol by a wet process for about eight hours to prepare mixtures.

Next, KCl was prepared as a flux. The mixtures and KCl were mixed in a weight ratio of 1:1, were subjected to heat treatment in an alumina crucible at about 900° C. to 1,100° C. for ten hours, and were cooled. Afterwards, KCl is removed by rinsing with ion exchange water, thus obtaining ceramic particles of Sample Nos. 1 to 38.

Next, the ceramic particles of Sample Nos. 1 to 38 were observed with a scanning electron microscope to determine the average particle size of their main surfaces. Specifically, the average particle size was determined from the areas of the largest surfaces of the ceramic particles, which were determined as the areas of the main surfaces and which were considered perfect circles.

In addition, the aspect ratio was determined by measuring the maximum diameter D of a main surface and the thickness t in a direction perpendicular to the main surface and dividing the maximum diameter D by the thickness t.

Table 1 shows the compositions, heat-treatment temperatures, average particle sizes, and aspect ratios of Sample Nos. 1 to 38.

TABLE 1

| Sample No. | $(K_{1-x-y}Na_xLi_y)_4(Nb_{1-z}Ta_z)_6O_{17} + aMeO_b$ | | | | | Heat-treatment temperature (° C.) | Average particle size (μm) | Aspect ratio (—) |
|---|---|---|---|---|---|---|---|---|
| | x | y | z | Me | a | | | |
| 1* | 0 | 0 | 0 | — | 0 | 900 | 0.8 | 1.1 |
| 2* | 0 | 0 | 0 | — | 0 | 1000 | 0.8 | 1.2 |
| 3* | 0 | 0 | 0 | — | 0 | 1100 | 1.2 | 1.5 |
| 4* | 0 | 0 | 0 | Sb | 0.0005 | 1000 | 0.8 | 1.4 |
| 5 | 0 | 0 | 0 | Sb | 0.001 | 1000 | 1.0 | 2.6 |
| 6 | 0 | 0 | 0 | Sb | 0.01 | 1000 | 28.0 | 5.3 |
| 7 | 0 | 0 | 0 | Sb | 0.05 | 1000 | 44.0 | 6.9 |
| 8 | 0 | 0 | 0 | Sb | 0.1 | 1000 | 55.0 | 6.7 |
| 9 | 0 | 0 | 0 | Sb | 0.1 | 1100 | 95.0 | 8.3 |
| 10* | 0 | 0 | 0 | Sb | 0.2 | 1000 | 50.0 | 6.7 |
| 11 | 0 | 0 | 0 | Mn | 0.01 | 1000 | 32.0 | 5.1 |
| 12 | 0 | 0 | 0 | Mn | 0.05 | 1000 | 40.0 | 5.9 |
| 13 | 0 | 0 | 0 | Mn | 0.1 | 1000 | 48.0 | 6.1 |
| 14* | 0 | 0 | 0 | Mn | 0.2 | 1000 | 40.0 | 5.5 |
| 15 | 0 | 0 | 0 | Cu | 0.01 | 1000 | 22.0 | 5.4 |
| 16 | 0 | 0 | 0 | Cu | 0.1 | 1000 | 26.0 | 6.5 |
| 17* | 0 | 0 | 0 | Cu | 0.2 | 1000 | 18.0 | 5.4 |
| 18 | 0 | 0 | 0 | Si | 0.01 | 1000 | 20.0 | 5.1 |
| 19 | 0 | 0 | 0 | Si | 0.1 | 1000 | 23.0 | 5.9 |
| 20* | 0 | 0 | 0 | Si | 0.2 | 1000 | 20.0 | 5.2 |
| 21 | 0 | 0 | 0 | Ti | 0.01 | 1000 | 24.0 | 5.3 |
| 22 | 0 | 0 | 0 | Ti | 0.1 | 1000 | 26.0 | 5.5 |
| 23* | 0 | 0 | 0 | Ti | 0.2 | 1000 | 16.0 | 5.1 |
| 24 | 0 | 0 | 0 | V | 0.01 | 1000 | 38.0 | 6.4 |
| 25 | 0 | 0 | 0 | V | 0.1 | 1000 | 40.0 | 6.7 |
| 26* | 0 | 0 | 0 | V | 0.2 | 1000 | 38.0 | 6.4 |
| 27 | 0 | 0 | 0 | W | 0.01 | 1000 | 19.0 | 5.2 |
| 28 | 0 | 0 | 0 | W | 0.1 | 1000 | 25.0 | 5.1 |
| 29* | 0 | 0 | 0 | W | 0.2 | 1000 | 20.0 | 5.4 |
| 30 | 0.1 | 0 | 0 | Sb | 0.01 | 1000 | 32.0 | 5.9 |
| 31 | 0.1 | 0 | 0 | Sb | 0.1 | 1000 | 54.0 | 6.4 |
| 32 | 0.5 | 0 | 0 | Sb | 0.01 | 1000 | 35.0 | 6.1 |
| 33 | 0 | 0.1 | 0 | Sb | 0.01 | 1000 | 32.0 | 5.9 |
| 34 | 0 | 0.1 | 0 | Sb | 0.1 | 1000 | 37.0 | 5.8 |
| 35 | 0 | 0.3 | 0 | Sb | 0.01 | 1000 | 28.0 | 5.5 |
| 36 | 0 | 0 | 0.1 | Sb | 0.01 | 1000 | 30.0 | 5.4 |
| 37 | 0 | 0 | 0.1 | Sb | 0.1 | 1000 | 38.0 | 6.1 |
| 38 | 0 | 0 | 0.3 | Sb | 0.01 | 1000 | 30.0 | 5.9 |

*beyond the scope of the invention

In Sample Nos. 1 and 2, the ceramic particles had a small average particle size, namely, 0.8 μm, and a small aspect ratio, namely, 1.1 to 1.2. In these cases, anisotropically shaped ceramic particles of desired plate-like shape could not be obtained because of insufficient crystal growth since the ceramic particles did not contain the particular oxide $MeO_b$ and were heated at a low temperature, namely, 900° C. to 1,000° C.

In Sample No. 3, where the heat-treatment temperature was raised to 1,100° C., the ceramic particles had an average particle size exceeding 1 μm, namely, 1.2 μm, because the crystal growth was promoted as compared with Sample Nos. 1 and 2. These ceramic particles, however, had a small aspect ratio, namely, 1.5, because they did not contain the particular oxide $MeO_b$. This shows that desired anisotropically shaped ceramic particles could not be obtained.

In Sample Nos. 4 to 10, the ceramic particles contained $Sb_2O_3$ as the particular oxide, that is, the minor component.

In Sample No. 4, the ceramic particles contained $Sb_2O_3$, although its molar content a was low, namely, 0.0005 moles per mole of the major component. These ceramic particles had a small average particle size, namely, 0.8 μm, and a small aspect ratio, namely, 1.4. Thus, desired anisotropically shaped ceramic particles could not be obtained.

In contrast, the ceramic particles of Sample Nos. 5 to 9 in which the molar content a of $Sb_2O_3$ was 0.001 to 0.1 moles per mole of the major component, had an average particle size of 1.0 μm or more and an aspect ratio of 2.6 or more. Thus, anisotropically shaped ceramic particles of desired plate-like shape could be obtained. It was also demonstrated that the average particle size and the aspect ratio increase with the molar content of $Sb_2O_3$ within the above range.

In particular, for Sample Nos. 6 to 9, in which the molar content a of $Sb_2O_3$ was 0.01 to 0.1 moles per mole of the major component, it was found that the ceramic particles had a significantly increased average particle size, namely, 28.0 μm or more, and a significantly increased aspect ratio, namely, 5.3 or more.

In addition, a comparison between Sample Nos. 8 and 9 shows that the average particle size and the aspect ratio of ceramic particles of the same composition tend to increase with the heat-treatment temperature.

On the other hand, in Sample No. 10, where the molar content a of $Sb_2O_3$ was excessive, namely, 0.2 moles per mole of the major component, the ceramic particles had a smaller average particle size than those of Sample No. 8, which were produced at the same heat-treatment temperature. It is also preferable to minimize the content of $Sb_2O_3$, serving as the minor component, as long as a desired average particle size and a desired aspect ratio can be ensured, because the anisotropically shaped ceramic particles are used as a reactive template for a crystal-oriented ceramic.

That is, it was found that the molar content a of $Sb_2O_3$ in the ceramic particles is preferably 0.01 to 0.1 moles per mole of the major component.

FIG. 1 is a scanning electron micrograph of the ceramic particles of Sample No. 6, and FIG. 2 is a scanning electron micrograph of the ceramic particles of Sample No. 4.

In Sample No. 4, the molar content a of $Sb_2O_3$ was low, namely, 0.0005 moles per mole of the major component, which is beyond the scope of the invention. As shown in FIG. 2, it was found that anisotropically shaped ceramic particles of plate-like shape could not be obtained.

In contrast, the molar content a of $Sb_2O_3$ was 0.01 moles per mole of the major component in Sample No. 6, which is within the scope of the invention. As shown in FIG. 1, it was demonstrated that anisotropically shaped ceramic particles of desired plate-like shape could be obtained.

In Sample Nos. 11 to 14, the ceramic particles contained MnO as the minor component.

In Sample Nos. 11 to 13, where the molar content a of MnO was 0.01 to 0.1 moles per mole of the major component, the ceramic particles had an average particle size of 32.0 to 48.0 μm and an aspect ratio of 5.1 to 6.1. As in Sample Nos. 6 to 9, it was found that anisotropically shaped ceramic particles of desired plate-like shape could be obtained.

On the other hand, the ceramic particles of Sample No. 14, in which the molar content a of MnO was excessive, namely, 0.2 moles per mole of the major component, had a smaller average particle size and aspect ratio than those of Sample No. 13, which were produced at the same heat-treatment temperature.

Thus, it was demonstrated that the molar content a of MnO in the ceramic particles is preferably 0.1 moles or less per mole of the major component.

In Sample Nos. 15 to 17, the ceramic particles contained CuO as the minor component.

The ceramic particles of Sample Nos. 15 and 16, in which the molar content a of CuO was 0.01 to 0.1 moles per mole of the major component, had an average particle size of 22.0 to 26.0 μm and an aspect ratio of 5.4 to 6.5. As in Sample Nos. 6 to 9, it was found that anisotropically shaped ceramic particles of desired plate-like shape could be obtained.

On the other hand, Sample No. 17 had a molar content a of CuO which was excessive, namely, 0.2 moles per mole of the major component, and the ceramic particles had a smaller average particle size and aspect ratio than those of Sample No. 16, which were produced at the same heat-treatment temperature.

Thus, it was demonstrated that the molar content a of CuO in the ceramic particles is preferably 0.1 moles or less per mole of the major component.

In Sample Nos. 18 to 20, the ceramic particles contained $SiO_2$ as the minor component.

In Sample Nos. 18 and 19, where the molar content a of $SiO_2$ was 0.01 to 0.1 moles per mole of the major component, the ceramic particles had an average particle size of 20.0 to 23.0 μm and an aspect ratio of 5.1 to 5.9. As in Sample Nos. 6 to 9, it was found that anisotropically shaped ceramic particles of desired plate-like shape could be obtained.

On the other hand, Sample No. 20 had a molar content a of $SiO_2$ which was excessive, namely, 0.2 moles per mole of the major component, and the ceramic particles had a smaller average particle size and aspect ratio than those of Sample No. 19, which were produced at the same heat-treatment temperature.

Thus, it was demonstrated that the molar content a of $SiO_2$ in the ceramic particles is preferably 0.1 moles or less per mole of the major component.

In Sample Nos. 21 to 23, the ceramic particles contained $TiO_2$ as the minor component.

Sample Nos. 21 and 22 had a molar content a of $TiO_2$ was 0.01 to 0.1 moles per mole of the major component, and the ceramic particles had an average particle size of 24.0 to 26.0 μm and an aspect ratio of 5.3 to 5.5. As in Sample Nos. 6 to 9, it was found that anisotropically shaped ceramic particles of desired plate-like shape could be obtained.

On the other hand, the ceramic particles of Sample No. 23, in which the molar content a of $TiO_2$ was excessive, namely, 0.2 moles per mole of the major component, had a smaller average particle size and aspect ratio than those of Sample No. 22, which were produced at the same heat-treatment temperature.

Thus, it was demonstrated that the molar content a of $TiO_2$ in the ceramic particles is preferably 0.1 moles or less per mole of the major component.

In Sample Nos. 24 to 26, the ceramic particles contained $V_2O_5$ as the minor component.

The ceramic particles of Sample Nos. 24 and 25, in which the molar content a of $V_2O_5$ was 0.01 to 0.1 moles per mole of the major component, had an average particle size of 38.0 to 40.0 μm and an aspect ratio of 6.4 to 6.7. As in Sample Nos. 6 to 9, it was found that anisotropically shaped ceramic particles of desired plate-like shape could be obtained.

On the other hand, the ceramic particles of Sample No. 26, in which the molar content a of $V_2O_5$ was excessive, namely, 0.2 moles per mole of the major component, had a smaller average particle size and aspect ratio than those of Sample No. 25, which were produced at the same heat-treatment temperature.

Thus, it was demonstrated that the molar content a of $V_2O_5$ in the ceramic particles is preferably 0.1 moles or less per mole of the major component.

In Sample Nos. 27 to 29, the ceramic particles contained $WO_3$ as the minor component.

The ceramic particles of Sample Nos. 27 and 28, in which the molar content a of $WO_3$ was 0.01 to 0.1 moles per mole of the major component, had an average particle size of 19.0 to 25.0 μm and an aspect ratio of 5.1 to 5.2. As in Sample Nos. 6 to 9, it was found that anisotropically shaped ceramic particles of desired plate-like shape could be obtained.

On the other hand, in Sample No. 29, where the molar content a of $WO_3$ was excessive, namely, 0.2 moles per mole of the major component, the ceramic particles had a smaller average particle size and aspect ratio than those of Sample No. 28, which were produced at the same heat-treatment temperature.

Thus, it was demonstrated that the molar content a of $WO_3$ in the ceramic particles is preferably 0.1 moles or less per mole of the major component.

As is obvious from Sample Nos. 4 to 29, it was demonstrated that the molar content a of the minor component is preferably 0.001 to 0.1 moles, more preferably 0.01 to 0.1 moles, per mole of the major component.

In Sample Nos. 30 to 32, some of the potassium was replaced with sodium.

In Sample No. 30, the replacement molar ratio x of sodium was 0.1, and it was found that the average particle size was increased from 28.0 μm to 32.0 μm and the aspect ratio was increased from 5.3 to 5.9 as compared with Sample No. 6, which had the same composition except that the replacement molar ratio x was 0.

In Sample No. 31, where the replacement molar ratio x of sodium was 0.1, it was found that the average particle size and the aspect ratio were slightly lower than those of Sample No. 8, which had the same composition except that the replacement molar ratio x was 0, although they were sufficient.

The replacement molar ratio x of sodium was 0.5 in Sample No. 32, and the average particle size and the aspect ratio increased compared with Sample No. 30 less than the average particle size and the aspect ratio of Sample No. 30 increased compared with Sample No. 6. That is, it was found that the average particle size and the aspect ratio cannot be increased even if the replacement molar ratio x of sodium is increased to the range of more than 0.5 for the same composition and the same heat-treatment temperature. Thus, it can be thought that the replacement molar ratio x of sodium is preferably 0 to 0.5.

In Sample Nos. 33 to 35, some of the potassium was replaced with lithium.

In Sample No. 33, in which the replacement molar ratio y of lithium was 0.1, it was found that the average particle size was increased from 28.0 μm to 32.0 μm and the aspect ratio was increased from 5.3 to 5.9 as compared with Sample No. 6, which had the same composition except that the replacement molar ratio y was 0.

It was found that the average particle size and the aspect ratio of Sample No. 34, in which the replacement molar ratio y of lithium was 0.1, were lower than those of Sample No. 8, which had the same composition except that the replacement molar ratio y was 0, although they were sufficient.

In Sample No. 35, where the replacement molar ratio y of lithium was 0.5, both the average particle size and the aspect ratio were decreased as compared with Sample No. 33. That is, it was found that the average particle size and the aspect ratio cannot be increased even if the replacement molar ratio y of lithium is increased to the range of more than 0.3 for the same composition and the same heat-treatment temperature. Thus, it can be thought that the replacement molar ratio y of lithium is preferably 0 to 0.3.

In Sample Nos. 36 to 38, some of the niobium was replaced with tantalum.

The replacement molar ratio z of tantalum was 0.1 in Sample No. 36, and it was found that the average particle size was increased from 28.0 μm to 30.0 μm and the aspect ratio was increased from 5.3 to 5.4 as compared with Sample No. 6, which had the same composition except that the replacement molar ratio z was 0.

In Sample No. 37, where the replacement molar ratio z of tantalum was 0.1, it was found that the average particle size and the aspect ratio were lower than those of Sample No. 8, which had the same composition except that the replacement molar ratio z was 0, although they were sufficient.

In Sample No. 38, in which the replacement molar ratio z of tantalum was 0.3, the aspect ratio was increased as compared with Sample No. 36, but the average particle size was equivalent. That is, it was found that the average particle size is difficult to increase even if the replacement molar ratio z of tantalum is increased to the range of more than 0.3 for the same composition and the same heat-treatment temperature. Thus, it can be thought that the replacement molar ratio z of tantalum is preferably 0 to 0.3.

EXAMPLE 2

The anisotropically shaped ceramic powder ($K_4Nb_6O_{17}$+0.01$SbO_{3/2}$) of Sample No. 6 in Table 1 was used as a reactive template to prepare a ceramic powder containing $KNbO_3$ as the major component.

Specifically, the anisotropically shaped ceramic powder of Sample No. 6 was mixed with $K_2CO_3$ so that the content of $K_2CO_3$ was 1 mole per mole of the major component of the anisotropically shaped ceramic particles, namely, $K_4Nb_6O_{17}$. This mixture was fed into a ball mill with ethanol and was stirred in the ball mill by a wet process for eight hours to prepare a mixed powder.

Subsequently, the mixed powder and KCl (flux) were mixed in a weight ratio of 1:1, subjected to heat treatment in an alumina crucible at 1,000° C. for ten hours, and were cooled to precipitate crystals. Afterwards, KCl was removed by rinsing with ion exchange water heated to about 80° C., thus obtaining a ceramic powder containing $KNbO_3$ as the major component.

FIG. 3 is a scanning electron micrograph of the ceramic powder.

As shown in FIG. 3, the ceramic powder prepared using the anisotropically shaped ceramic powder of the present invention as a reactive template had a plate-like shape.

These plate-like ceramic particles were pulverized in a mortar and were analyzed by X-ray diffractometry. Although not shown, it was demonstrated that the resultant peak profile coincided with that of $KNbO_3$.

The invention claimed is:

1. Anisotropically shaped ceramic particles of plate-like shape represented by the general formula $$(K_{1-x-y}Na_xLi_y)_4(Nb_{1-z}Ta_z)_6O_{17}+aMeO_b$$

wherein Me is at least one element selected from the group consisting of antimony, copper, manganese, vanadium, silicon, titanium, and tungsten; b is a positive number determined by the valence of Me; and wherein x, y, z, and a are, respectively:

$0 \leq x \leq 0.5$;
$0 \leq y \leq 0.3$;
$0 \leq z \leq 0.3$; and
$0.001 \leq a \leq 0.1$.

2. The anisotropically shaped ceramic particles according to claim 1, wherein the average particle size is 1 to 100 μm, and the ratio D/t of a maximum diameter D of a main surface to a thickness t in a direction perpendicular to the main surface is 2 or more.

3. The anisotropically shaped ceramic particles according to claim 2, wherein the ratio D/t is 5 or more.

4. The anisotropically shaped ceramic particles according to claim 3, wherein $0 \leq x \leq 0.1$; $0 \leq y \leq 0.1$; and $0.01 \leq a \leq 0.1$.

5. In a method of preparing a crystal-oriented perovskite alkali metal niobate-based ceramic using anisotropically shaped ceramic particles as a reactive template in which the anisotropically shaped ceramic particles are mixed with an alkali metal compound, and the mixture is heated, utilizing the anisotropically shaped ceramic particles of claim 4 as said anisotropically shaped ceramic particles.

6. A crystal-oriented perovskite alkali metal niobate-based ceramic produced by the process of claim 5.

7. In a method of preparing a crystal-oriented perovskite alkali metal niobate-based ceramic using anisotropically shaped ceramic particles as a reactive template in which the anisotropically shaped ceramic particles are mixed with an alkali metal compound, and the mixture is heated, utilizing the anisotropically shaped ceramic particles of claim 3 as said anisotropically shaped ceramic particles.

8. A crystal-oriented perovskite alkali metal niobate-based ceramic produced by the process of claim 7.

9. The anisotropically shaped ceramic particles according to claim 2, wherein $0 \leq x \leq 0.1$; $0 \leq y \leq 0.1$; and $0.01 \leq a \leq 0.1$.

10. In a method of preparing a crystal-oriented perovskite alkali metal niobate-based ceramic using anisotropically shaped ceramic particles as a reactive template in which the anisotropically shaped ceramic particles are mixed with an alkali metal compound, and the mixture is heated, utilizing the anisotropically shaped ceramic particles of claim 9 as said anisotropically shaped ceramic particles.

11. In a method of preparing a crystal-oriented perovskite alkali metal niobate-based ceramic using anisotropically shaped ceramic particles as a reactive template in which the anisotropically shaped ceramic particles are mixed with an alkali metal compound, and the mixture is heated, utilizing the anisotropically shaped ceramic particles of claim 2 as said anisotropically shaped ceramic particles.

12. A crystal-oriented perovskite alkali metal niobate-based ceramic produced by the process of claim 11.

13. The anisotropically shaped ceramic particles according to claim 1, wherein $0 \leq x \leq 0.1$; $0 \leq y \leq 0.1$; and $0.01 \leq a \leq 0.1$.

14. In a method of preparing a crystal-oriented perovskite alkali metal niobate-based ceramic using anisotropically shaped ceramic particles as a reactive template in which the anisotropically shaped ceramic particles are mixed with an alkali metal compound, and the mixture is heated, utilizing the anisotropically shaped ceramic particles of claim 13 as said anisotropically shaped ceramic particles.

15. In a method of preparing a crystal-oriented perovskite alkali metal niobate-based ceramic using anisotropically shaped ceramic particles as a reactive template in which the anisotropically shaped ceramic particles are mixed with an alkali metal compound, and the mixture is heated, utilizing the anisotropically shaped ceramic particles of claim 1 as said anisotropically shaped ceramic particles.

16. A crystal-oriented perovskite alkali metal niobate-based ceramic produced by the process of claim 15.

17. A method for producing anisotropically shaped ceramic particles of plate-like shape, comprising:
    providing a calcined powder which is a calcined mixture of major-component precursor materials whose composition is such that the major component is represented by the general formula $(K_{1-x-y}Na_xLi_y)_4(Nb_{1-z}Ta_z)_6O_{17}$ in which $0 \leq x \leq 0.5$, $0 \leq y \leq 0.3$, and $0 \leq z \leq 0.3$;
    mixing a minor component comprising an oxide or oxide precursor of at least one element selected from the group consisting of antimony, copper, manganese, vanadium, silicon, titanium, and tungsten with the calcined powder in an amount of 0.001 to 0.1 moles per mole of the major component to prepare a mixed powder;
    combining a flux with the mixed powder and heating the resulting composition; and
    removing the flux after the heating.

18. The method for producing anisotropically shaped ceramic particles according to claim 17, wherein the flux is KCl, NaCl, and a mixture thereof, and the minor component is an oxide.

19. The method for producing anisotropically shaped ceramic particles according to claim 18, wherein mixture of flux and mixed powder is heated to a temperature in the range of 900° to 1,100° C.

20. The method for producing anisotropically shaped ceramic particles according to claim 17, wherein mixture of flux and mixed powder is heated to a temperature in the range of 900° to 1,100° C.

* * * * *